United States Patent [19]

Kilb et al.

[11] Patent Number: 4,882,242
[45] Date of Patent: Nov. 21, 1989

[54] CLOSED GASTIGHT BATTERY, IN PARTICULAR NICKEL-CADMIUM

[75] Inventors: Manfred Kilb, Frankfurt am Main; Klaus D. Degen, Bad Homburg, both of Fed. Rep. of Germany

[73] Assignee: Christoph Emmerich GmbH & Co. KG, Frankfurt am Main, Fed. Rep. of Germany

[21] Appl. No.: 229,322

[22] Filed: Aug. 8, 1988

[30] Foreign Application Priority Data

Sep. 2, 1987 [DE] Fed. Rep. of Germany ... 8711863[U]
Jul. 16, 1988 [DE] Fed. Rep. of Germany ....... 3824222

[51] Int. Cl.$^4$ .............................................. H01M 6/42
[52] U.S. Cl. ..................................... 429/154; 429/164
[58] Field of Search ................................. 429/152–155, 429/164

[56] References Cited

U.S. PATENT DOCUMENTS 2,496,709  2/1950  Gelardin ............................. 429/155
2,620,369  12/1952  Daniel .................................. 429/154
3,895,959  7/1975  Dehmelt ............................. 429/152

FOREIGN PATENT DOCUMENTS 3505558  2/1985  Fed. Rep. of Germany .

Primary Examiner—Donald L. Walton
Attorney, Agent, or Firm—H. Gibner Lehmann; K. Gibner Lehmann

[57] ABSTRACT

A closed gas-tight battery comprised of cells having electrodes, separators and electrolyte, each cell having its own housing which is open at one face and constituted of a circumferential plastic wall forming a sealing element in conjunction with a disk-shaped conductive face wall. The face wall is mounted at its peripheral rim in the one end portion of the circumferential wall, in gas and liquid-tight fashion. An end of the circumferential wall is flush, at the open end of the cell housing, with the plane of an adjoining cell component, while the other housing end lies in one plane with the outside surface of the conductive wall of the cell. Each cell forms a separate unit, and a stack of such units is sheathed by the battery casing to be sealed gas-tight.

18 Claims, 3 Drawing Sheets

CLOSED GASTIGHT BATTERY, IN PARTICULAR NICKEL-CADMIUM

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to closed, gas-tight batteries comprised of one or more voltaic elements connected in series and/or parallel. The invention has particular utility in connection with nickel-cadmium storage batteries which contain voltaic elements designed in the manner of cells and containing electrodes, separators and electrolyte, which cells are inserted in a common, gas-tight and liquid-tight casing of electrically conductive material, preferably metal.

2. Description of the Related Art Including Information Disclosed Under 37 CFR §§1.97–1.99

Electrical batteries of this kind are known in the greatest variety of forms and in particular in the form of round cells, as both primary batteries and storage batteries. In all known batteries of this kind there are special difficulties with respect to sealing the battery housing at the battery lid. In this regard, nickel-cadmium storage batteries present a special difficulty because the alkaline electrolyte therein used has, up to the present day, leaked through all the seals that were provided at the battery lid, either to a greater or a lesser degree in the course of time.

According to German patent application DE 35 05 558 Al, it has been attempted to provide some relief from this problem by giving the end cell which is located at the open side of the battery casing a lid comprising a metal face wall whose circumferential rim was molded into an annular sealing element. Located at this annular sealing element there was a separate sealing lip of the battery casing, intended to secure the battery lid by pressing firmly against it at its circumferential rim portion at the time of the closing of the battery casing. But despite this additional effort, no absolutely safe seal could be obtained in this way.

Another considerable drawback that was inherent in all batteries of the above mentioned type is the necessity for a costly assembly of the voltaic elements, both when assembling the various components involved and also when adding the electrolyte.

It is notable that such assembly of the voltaic elements into a common or single storage battery casing heretofore has caused considerable unsolvable difficulties especially in view of the necessity of giving all the assembled parts their proper positions and maintaining such proper positions in the assembly until the storage battery casing is closed.

SUMMARY OF THE INVENTION

Therefore, it is an object of the present invention to obviate such drawbacks and disadvantages and to provide an improved gas-tight battery of the kind mentioned above, which not only eliminates the present sealing difficulties on the one hand but on the other hand also substantially facilitates the assembly work or putting together of the various components contained in the battery including the addition of the electrolyte.

According to the present invention, these problems are solved in that each one of the voltaic elements contained in the battery, with its components, is inserted into its own cell housing which is open at the face and which is formed by an electrically insulating circumferential housing wall constituted as a sealing element, and by a disk-shaped face wall of electrically conductive material, in particular metal, whose circumferential rim or edge portion is attached in gas-tight and liquid-tight relation to the one end portion of the circumferential housing wall, the face rim or end surface of the circumferential housing wall being flush with an outward face of the voltaic element components, in particular the outward face of the element adjoining the open end of the cell housing. The end surface of the circumferential wall also lies in the same plane as the outside surface of the disk-shaped face wall of electrically conductive material of an adjoining cell and its housing at the closed end of such adjoining cell.

What the invention thus achieves is that each one of the individual voltaic cells can be fully assembled from its components as an individual working unit, provided with electrolyte in its own cell housing. Then a number of such units, hereinafter merely called "cells", can be stacked on top of each other, depending on the desired output values, and a can-shaped storage battery casing can thereafter be placed over the stack of cells.

Such stacking mode of construction readily makes possible the use of voltaic or cell elements of different height or thickness and, hence, of different charge capacity by simply changing the casing height. This makes for a desirable flexibility when producing different battery types, which means that batteries with a different number of voltaic elements, or batteries of different charge capacity, i.e. batteries of different height can be manufactured in one production machine without greatly changing the mechanical setup. The stacking mode of construction also offers a special safety in the uniform, optimal dosing of caustic solution for each cell because the stacking of several rectified elements makes caustic solution dosing easy without having to turn any cell element.

When closing the storage battery casing, the stack of cell elements is compressed axially by the axial pressure exerted at the closure rim of the casing, assuring on the one hand that the electrical contact from cell to cell is effective as well as to the casing bottom and to the casing lid. On the other hand, the entirety of the circumferential cell walls which are stacked on top of each other is compressed into an annular column, tightly sealing all elements. The circumferential cell housing walls, compressed into a column, form at the facing contact surfaces of adjacent cell housings a tight mutual closure which assures a reliable separation of electrolyte from cell to cell. At the same time, a reliable seal on the inside of the storage battery casing bottom is assured. In this context, it is particularly advantageous if the circumferential walls of the cell housings are constituted so as to be axially compressible. This makes it possible for all of the circumferential cell housing walls to be compressed axially by a certain amount when sealing the storage battery casing, so that a constant bearing point between the facing rims of adjacent circumferential wall ends and a constant sealing pressure at the bottom of the storage battery casing remains intact even over long periods of time.

By providing the face surfaces on the cell housing in the form of coaxial circumferential walls, a precisely defined position of the components accommodated in the cell housing, in particular of the electrodes and the separator or separators, is pre-established before the cell is assembled. It is made certain in this manner that, in assembly, the position of the electrodes and separator is exactly the same in all cells.

The circumferential cell housing wall consists preferably of ductile plastic that is chemically resistant to the electrolyte, e.g. polyamide. When producing the circumferential cell housing wall by molding, it is of particular advantage to mold the circumferential rim or edge portion of the electrically conductive face wall directly into the circumferential cell housing wall. For example, the circumferential wall may be produced by injection molding it like a ring around the circumferential rim or edge portion of the electrically conductive face wall.

The circumferential cell housing wall preferably consists in its entirety of a plastic suitable for use as a sealing element, and its face rims or ends are adapted to act directly as sealing elements. However, it is also possible to provide the circumferential cell housing wall at its facing rims or ends with separate annular sealing elements of a plastic that is resistant to the electrolyte, said sealing elements being in such case firmly joined to the circumferential wall so as to be leakproof. To improve the mutual stacking and mutual sealing of the circumferential cell walls, there may be formed in the diskshaped cell housing electrically conductive face wall an annular, axially displaced or recessed peripheral portion which is molded into the plastic circumferential wall at a location so as to be spaced from the latter's face rim. For improvement of the electrical contact it is recommended that the disk-shaped electrically conductive face wall be formed with contact projections engaging the adjoining cell element.

For the compensation of height differences of the individual cell elements, the use of a spring element inside the battery housing may be provided if the overall battery height is fixed.

If the battery casing is of can-shaped construction, the disk-shaped battery lid can be placed over that cell face wall which lies in the battery housing opening in a manner known from German patent application DE 35 05 558 A1, and clamped by means of a gasket to the mouth or rim of the battery casing which was folded inwardly to close the battery. This mode of closing and sealing alone, in conjunction with the novel structure according to the invention where each group of cell-like elements has a cell housing of its own, represents significant progress because the circumferential cell walls alone already form a virtually hermetic seal enclosing the voltaic elements and the battery electrolyte. But yet an additional improvement can be obtained by placing the disk-shaped battery lid over the electrically conductive cell face wall which is on the outside of the particular cell located at the open end of the can-shaped battery casing, and by molding the circumferential rim of the conductive face wall into the circumferential housing wall of the cell so that the mouth rim of the battery casing is then folded inwardly across the face rim or end of the cell housing wall. This mode of attaching the battery lid results in a completely hermetic seal of the battery casing if the face rim of the lowermost circumferential cell housing at the open housing end that is disposed at the bottom of the battery casing is also placed and pressed in sealing fashion against the inside of the can bottom wall of the battery casing at the same time.

To make certain of reliable electrical contacts between the voltaic elements and the battery casing it is recommended within the scope of the invention that the battery lid of the casing be welded to the electrically conductive face wall of the uppermost cell supporting it while the cell element at the open end of the lowermost cell housing, which belongs to the cell at the bottom of the battery casing is pressed down to touch and make good electrical contact with the inside surface of the can bottom of the casing.

The invention makes it possible to select the internal construction for the cell elements to meet the requirements of the desired applications. In the normal case, a cell housing constructed in accordance with the invention will contain two cell elements, namely one positive element and one negative element, and also a separator plate to maintain the electrolyte between both elements. The discharge capacity of such a unit, e.g. a nickel-cadmium storage battery, is determined essentially by the volume or size of the elements, and the momentarily available discharge current is determined by the element area accessible to the electrolyte from the separator. It is desirable for some applications to increase significantly the momentarily available discharge current while retaining an essentially constant discharge capacity. Within the scope of the battery cell structure according to the invention, the advantageous possibility exists to combine two or more pairs of elements in a single cell housing, by paralleling the elements of the same polarity. The interior space available in the cell housing essentially determines the element size or volume. By dividing the elements into two or more pairs, the element area accessible to the electrolyte is increased substantially. In this basic structure with two or more pairs of elements they can be arranged advantageously in rectified sequence within the pairs, with a disk-shaped, electrical insulating plate interposed between the elements of different polarity belonging to the various pairs. This disk-shaped electrical insulating plate assures the required electrical insulation between the element pairs, i.e. between the paralleled electrical part elements. Separating the electrolyte between the paralleled electrical part elements of one cell is normally not required and even undesired in some cases. Therefore, the cell containing two or more paralleled electrical part elements can form one unit now, as before, which merits all the advantages achieved within the scope of the invention.

Another possibility of varying the battery for the retention of the discharge capacity while furnishing a significantly increased momentary discharge current is that there is disposed in the interior of a cell accommodated in the cell housing, on each side of an essentially centrally arranged cell element of one polarity, a separator containing electrolyte and also a cell element of opposite polarity, said central cell element being electrically connected to an electrically conductive contact plate disposed at a face of the cell and electrically insulated against the element of opposite polarity.

BRIEF DESCRIPTION OF THE DRAWINGS

Embodiment examples of the invention are explained below in greater detail with reference to the drawing, in which.

DESCRIPTION OF THE PREFERRED EMBODIMENTS

Figure 1:
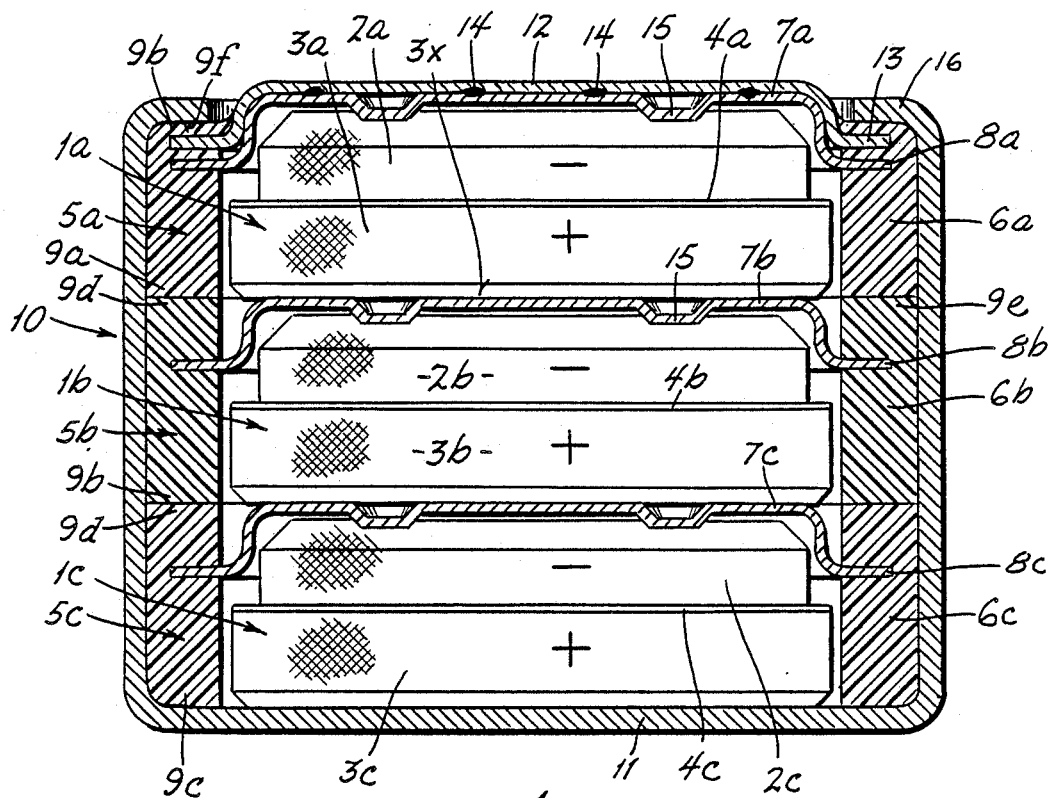
FIG. 1 is an axial section through a battery constructed according to the invention, formed of three nickel-cadmium cells each of closed gas-tight characteristic.
Figure 2:
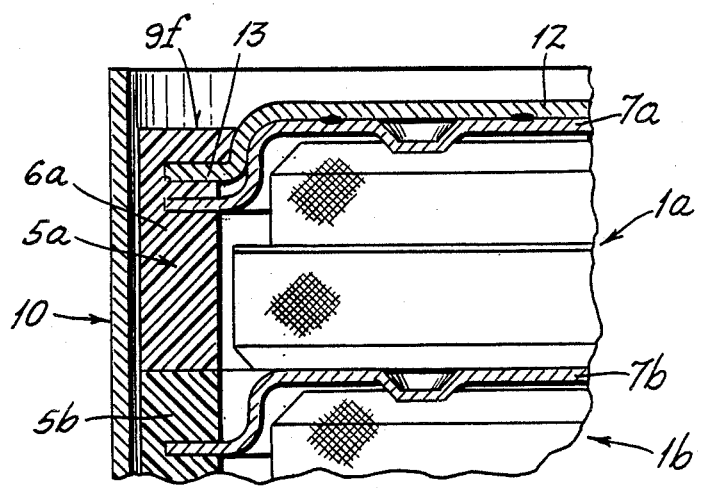
FIG. 2 is a partial sectional showing of FIG. 1, with the battery casing not yet closed.

In the example of FIGS. 1 and 2, each one of the three cells labelled 1a, 1b, or 1c is a nickel-cadmium storage battery unit with a negative electrode or cell element 2a, 2b or 2c, a positive electrode or cell element 3a, 3b or 3c, and a separator plate 4a, 4b or 4c. All three cells 1a, 1b and 1c comprise cell housings 5a, 5b and 5c comprising circumferential, annular uniform-thickness housing walls 6a, 6b and 6c, and electrically conductive faces or walls 7a, 7b and 7c. The walls 7a, 7b and 7c are recessed axially downward in their peripheral areas, and their peripheral rims or edge portions 8a, 8b and 8c are molded into the respective annular housing walls 6a, 6b and 6c. In this manner, an essentially cupshaped cell housing is had, which is open at one face or end, namely its lower end. In their axial lengths, the housing walls 6a, 6b and 6c are so constituted that their compression end face edges or ends 9a, 9b and 9c located at the open ends of the housings are of equal area and axially aligned and respectively flush with adjoining surfaces of the positive cell elements 3a, 3b and 3c which lie at the open ends of the housings. At the closed ends of the cell housings, the circumferential walls 6b and 6c extend axially beyond the points where the peripheries of the conductive walls are molded into the housings, and extend to the planes containing the outside surfaces of the conductive walls 7b and 7c. Therefore, when the assembled cells 1a, 1b and 1c are stacked on top of each other, the cell housing walls 6a, 6b and 6c can place themselves on top of each other in sealing fashion.

The cell 1a, intended for the open end of the battery casing 10, supports the lid 12 which, similar to the cell conductive wall 7a, has an axially recessed or displaced annular peripheral area or edge portion 13 which is also molded into the housing wall 6a. As indicated at 14, the lid 12 is permanently jointed to the conductive face wall 7a of the cell 1a by spot welding. The walls 7a, 7b and 7c are provided in their flat areas with contact projections 15 extending inwardly and engaging the respective negative cell elements 2a, 2b and 2c.

For the assembly of the battery shown, the open ends of the cell housings 5a, 5b and 5c are first oriented upwardly. Then the negative cell elements 2a, 2b and 2c, the separators 4a, 4b and 4c and the positive cell elements 3a, 3b and 3c are inserted. The required amount of electrolyte is then put in each cell. In this position, with the respective conductive walls 7a, 7b and 7c at the undersides of the cells, they are then stacked one on top of another. The battery casing 10 is then placed over the stack from the top, until the positive cell element 3c of cell 1c hits the bottom wall 11 of the casing. The cells 1a, 1b and 1c are now maximally compressed inside the battery casing 10 and the peripheral rim 16 of the casing is crimped inwardly over the edge or end 9f of the housing wall 6a of the outermost cell 1a so that the cells 1a, 1b and 1c are kept in a compressed state. In this condition, the housing ends 9a, 9b and 9c as well as the axially aligned equal-area ends or faces 9d and 9e and 9f which are aligned with ends 9a, 9b and 9c, are pressed firmly and tightly against each other, maintaining pressure against the inside surface of the casing bottom 11 as well as against the crimped rim 16 so as to assure that the battery casing is hermetically sealed. By the same token, the electrical contact between the cells 1a, 1b and 1c and also to the casing bottom 11 and lid 12 is assured.

FIG. 2 shows a rim portion of a nickel-cadmium battery in the process of being manufactured according to FIG. 1 where the circumferential portions of the lid 12 are not yet in gas-tight or sealed condition.

The top rim of the battery casing 10 is not yet crimped over the lid 12. However, the cells 1a and 1b (1c not visible) are already introduced into the battery casing 10. From the condition shown in FIG. 2, the stack of cells is compressed axially and the peripheral rim of the casing 10 is then crimped inwardly and pressed onto the annular face area 9f of the cell housing wall 6a to obtain the gas-tight and liquid-tight condition of the battery shown in FIG. 1.

It will now been seen from the foregoing that sealing of the cell 1a takes place because the housing rim or end surface 9a is flush and coplanar with the face surface 3x of the cell element 3a, and that these are engaged by coplanar sealing means comprising the housing end surface 9d and the electrically conductive wall 7b. This sealing means also includes, of course, the casing 10 and bottom wall 11, and the cell housings 5b and 5c. Similarly, the sealing means for the cell 1b comprises the wall 7c and housing 5c, as well as the battery case 10, crimp 16, housing 5a and case bottom wall 11. The sealing means for the cell 1c comprises the cells 1a and 1b, and the case 10, etc.

Figure 3:
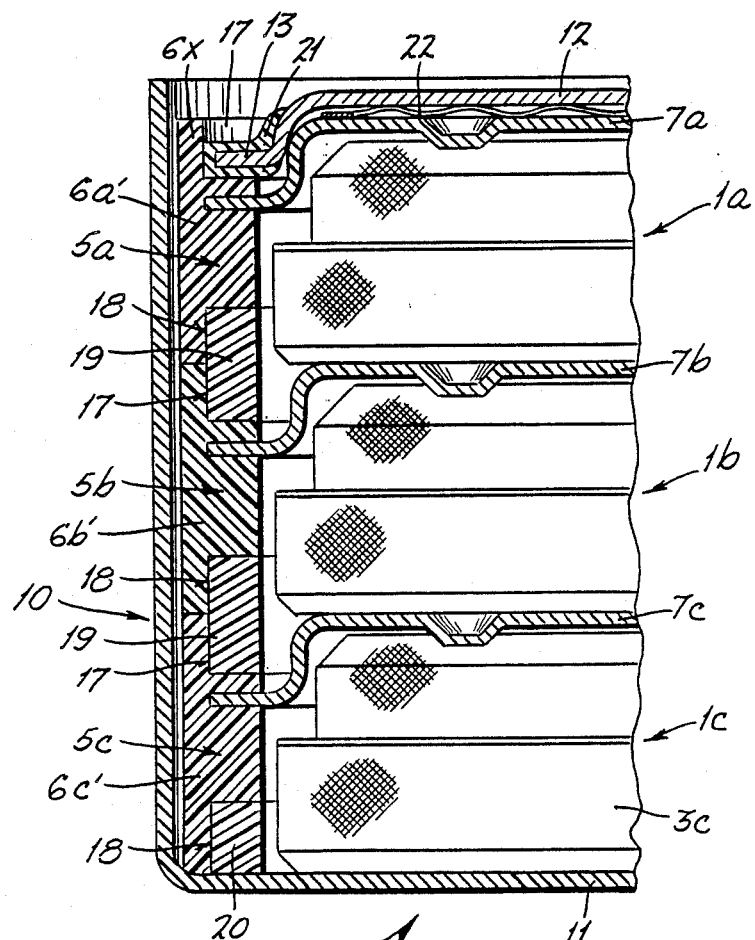
FIG. 3 is a fragmentary axial section of a modified embodiment of battery according to the invention, in still unclosed state.

In the example of FIG. 3, the same basic structures of the cells 1a, 1b and 1c as in the example of FIGS. 1 and 2 is assumed. But in the example of FIG. 3 a modification of the cell housings has been made in that the circumferential cell walls 6a', 6b' and 6c' have, at the ends which support the conductive walls 7a, 7b and 7c, inner, circular grooves 17 and at their open-face ends likewise, inner, circular grooves 18. Between adjacent cells there is inserted in the circular groove 18 of the one cell and the circular groove 17 of the other cell a ring-shaped plastic sealing element 19 which overlaps the superposed contacting areas of the adjacent housing walls 6a', 6b' and 6c'. In the inner, circular groove 18 of the lowest cell 1c there is inserted an annular plastic sealing element 20 which contacts the bottom wall 11 of the battery casing 10. The ringshaped sealing elements 19 and 20 preferably consist of a synthetic elastomer resistant to the electrolyte. The inner, circular groove 17 of the cell 1a located at the open end of the battery casing 10, serves as a seat for the peripheral rim portion 13 of the battery lid 12. As FIG. 3 shows, this peripheral rim portion 13 can preferably be provided with a coating 21 which can consist of a synthetic elastomer that is resistant to the electrolyte. To obtain a reliable electrical contact there can preferably be inserted between the conductive wall 7a and the battery lid 12 a spring element 22, for instance in the form of a corrugated stainless steel or other spring washer.

This embodiment of the invention also offers the advantage of the circumferential sealing housing walls $6a'$, $6b'$ and $6c'$, and additionally the advantage that the housings $5a$, $5b$ and $5c$ of all the cells $1a$, $1b$ and $1c$ are of identical design. Accordingly, only cells of one and the same kind need be provided for any one battery type.

When closing the battery casing 10, shown in FIG. 3 still in its open state, the stack of cells $1a$, $1b$ and $1c$ is first compressed axially. Since the annular web existing outside of the inner circular grooves 17 and 18 is relatively thin, the circumferential housing walls $6a'$, $6b'$ and $6c'$ are upset more in the area of these webs so that the annular sealing elements 19 and 20 receive the necessary axial pressure suitable for effective sealing. When closing the battery casing 10, this axial compression of the cells $1a$, $1b$ and $1c$ is followed by the inward crimping and pressing of the free mouth rim of the battery casing. In this operation, the thin web $6x$ of the circumferential housing wall $6a'$ surrounding the inner, circular groove 17 is pushed smoothly against the outside surface of the coating 21 on the peripheral rim portion 13 of the battery lid 12, and both the coating and the web of the housing wall $6a'$ are pressed and deformed firmly into each other. This results in a reliable, gas-tight and liquid-tight closure at the periphery of the battery lid 12. At the same time, the spring element 22 is put under tension, thus also making certain that the electrical contact between the battery lid 12 and the conductive cell wall $7a$, as well as between the cell element and all the cell conductive walls $7a$, $7b$ and $7c$ is established. Also, an effective electrical contact is established between the positive cell element $3c$ and the inside surface of the casing bottom 11. The spring element 22 provides assurance that this contact pressure, so important for electrical contact making, remains intact and virtually unchanged even over a long period of time.

Figure 4:
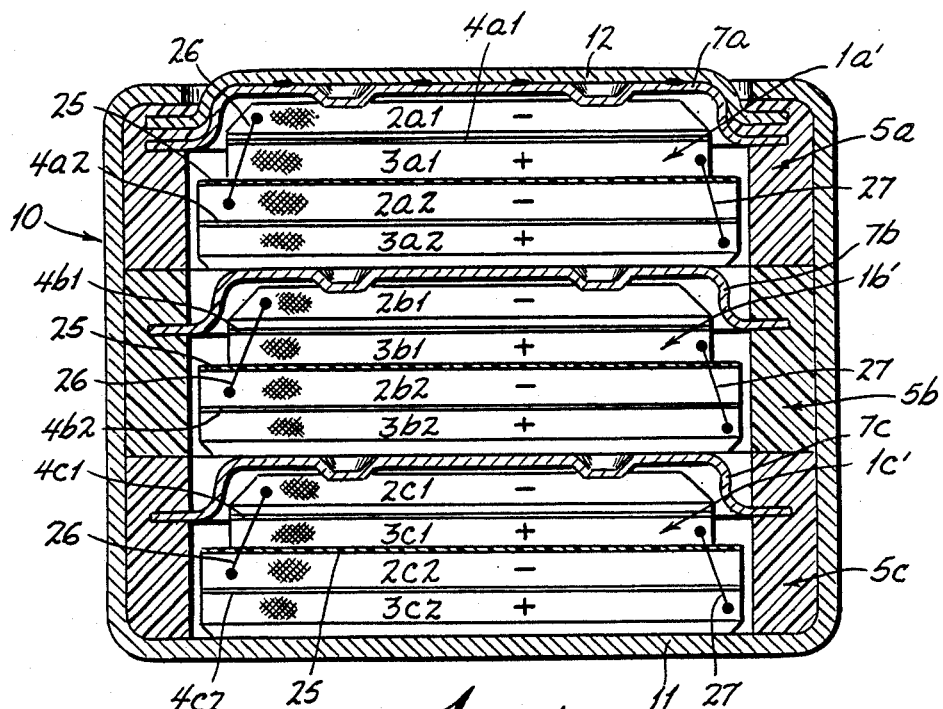
FIG. 4 is an axial section of yet another embodiment of battery according to the invention, having two pairs of cell elements in each cell housing.

Assuming the same cell housing construction as in the example of FIGS. 1 and 2, the example of FIG. 4 shows a modified arrangement of the storage battery cells $1a'$, $1b'$ and $1c'$. Here, each one of the cells $1a'$, $1b'$ and $1c'$ has a respective first negative cell element $2a1$, $2b1$ or $2c1$ in contact with the inside of the respective conductive wall $7a$, $7b$ or $7c$. This respective first negative element, together with a plate-shaped first positive element $3a1$, $3b1$, or $3c1$ disposed to be approximately centered in the cell housing, forms a first element pair containing a first separator $4a1$, $4b1$ or $4c1$ so that this element pair constitutes a complete or operable battery unit occupying only a part of the cell housing and therefore herein termed a "part element" in this context. Towards the open end of the cell housing, this "part element" is covered by an electrically insulating plate 25. The insulating plate 25 is preferably in foil form and consists of a plastic that is resistant to the electrolyte. All the insulating plates 25 represent the electrical insulation between the positive elements $3a1$, $3b1$ and $3c1$ and the negative elements $2a2$, $3a2$ and $4a2$ of the second pair of elements on the other side of the insulating plates. The insulating plates 25 are not intended to form a seal for the electrolyte. The electrolyte should rather be able to travel within the entire inside space of the cell housing.

The second set of plate-shaped negative elements $2a2$, $2b2$, and $2c2$ which are disposed in the central areas of the cell housings forms, together with a second set of plate-shaped positive elements $3a2$, $3b2$ and $3c2$ disposed at the open ends of the cell housings and a second set of separators $4a2$, $4b2$ and $4c2$ disposed between them, a second "part element". The said two part-elements are connected in parallel by electrically insulated electrical conductors 26 going respectively from the first negative elements $2a1$, $2b1$ and $2c1$ to the second negative elements $2a2$, $2b2$ and $2c2$, and by insulated electrical conductors going respectively from the first positive elements $3a1$, $3b1$ and $3c1$ to the second positive elements $3a2$, $3b2$ and $3c2$.

Since the total volume of the negative elements $2a1$, $2a2$, respectively, $2b1$, $2b2$, respectively, $2c1$, $2c2$ corresponds to the volume of the respective negative elements $2a$, $2b$, and $2c$ of the embodiment according to FIG. 1, and the same condition also applies to the positive elements, the discharge capacity of the battery according to FIG. 4 approximates that of the battery per FIG. 1 (provided the type size is the same). But the areas of the negative elements and positive elements opposite each other across the separators are considerably greater in a battery constructed in accordance with FIG. 4. This makes it possible for the battery of FIG. 4 to furnish much greater momentary electric currents than the battery according to FIG. 1.

Figure 5:
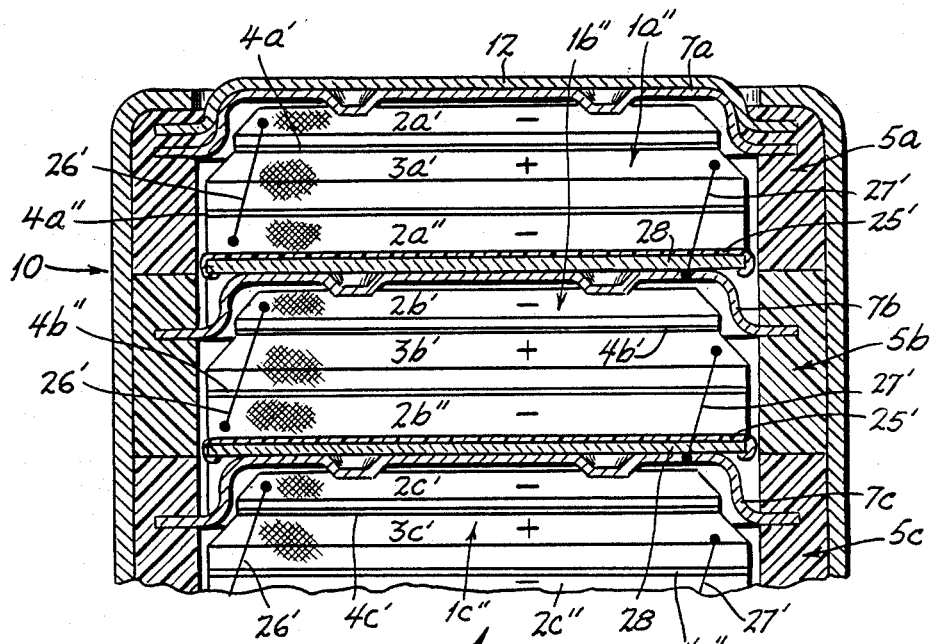
FIG. 5 is a fragmentary axial section of still another modified embodiment of battery according to the invention.

Another example of a modified internal construction of the battery elements $1a''$, $1b''$ and $1c''$ is given in FIG. 5. In the embodiment shown there, sets of two negative element plates $2a'$, $2a''$; $2b'$, $2b''$; and $2c'$, $2c''$ respectively are accommodated inside each cell housing. The respective negative element plates $2a'$, $2b'$ and $2c'$ lie on the insides of the respective conductive walls $7a$, $7b$ and $7c$ while the respective second negative element plates $2a''$, $2b''$ and $2c''$ are disposed at the open ends of the respective housings. Provided respectively between each of the two negative element plates is a positive element plate $3a'$, $3b'$ or $3c'$ whose electrical discharge capacity matches that of the sum of both negative elements $2a'$, $2a'''$; $2b'$, $2b''$; or $2c'$, $2c''$, respectively. The positive element plate $3a'$, $3b'$ or $3c'$ supports on both sides respectively separators $4a'$, $4a''$; $4b'$, $4b''$; or $4c'$, $4c''$. The negative element plates $2a'$, $2a''$; $2b'$, $2b''$; or $2c'$, $2c''$, respectively, are interconnected by insulated electrical conductors $26'$, i.e. they are paralleled. To make the potential of any positive element plate $3a'$, $3b'$ or $3c'$ available at the open end of its cell housing, there is inserted in the open end of each cell housing a contact plate 28 which is electrically insulated against the respective negative element plate $2a''$, $2b''$ or $2c''$ disposed in the area of the open end of the cell housing, by means of an electrical insulator $25'$. The contact plates 28 are connected to the positive element plates $3a'$, $3b'$ or $3c'$, respectively, by an insulated electrical conductor $27'$. Because a high electrical voltage gradient must be expected between the negative element plates $2a''$, $2b''$ or $2c''$ disposed in the mouth area of the cell housings and the respective contact plates 28 and respective conductive walls $7a$, $7b$ or $7c$ in the battery according to the example of FIG. 5, it is recommended to lead the electrical insulation $25'$ of the contact plates 28 around the latter's peripheral rims and at the same time have it act as a seal for the electrolyte at the open ends of the cell housings. For example, the electrical insulation $25'$ may be constituted as a unilateral coating on each contact plate 28, overlapping the latter's peripheral rim.

In the example of FIG. 5, too, the electrical discharge capacity of the same type size can be made to match approximately that of a battery constructed according to FIG. 1. Also when constructed according to FIG. 5, the battery is enabled to furnish higher momentary electric currents than the battery of FIG. 1.

In the embodiment examples shown, an essentially cylindrical battery casing 10 is used. But it is also possible to give the battery casing any other desired cross-sectional shape, such as an oval or square one with rounded corner areas, or a rectangular one with rounded corner areas. The cell housing walls 6a, 6b and 6c, or 6a', 6b' and 6c' as well as the cell conductive walls 7a, 7b and 7c can be constructed without problems, to match the respective cross-sectional shape of the battery casing 10. In such cases, however, the convexity of the corner areas occurring in the cross-sectional shape must then be made with a large enough radius of curvature to assure that the crimping and sealing operations at the battery lid 12 can be performed effectively.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

| | List of Reference Symbols |
|---|---|
| 1a, 1b, 1c | Battery cells |
| 2a, 2b, 2c | Negative eletrodes or cell elements |
| 2a', 2b', 2c' | Negative electrodes or cell elements |
| 2a'', 2b'', 2c'' | Negative electrodes or cell elements |
| 2a1, 2b1, 2c1 | Negative electrodes or cell elements |
| 2a2, 2b2, 2c2 | Negative electrodes or cell elements |
| 3a, 3b, 3c | Positive electrodes or cell elements |
| 3a', 3b', 3c' | Positive electrodes or cell elements |
| 3a1, 3a2, 3a3 | Positive electrodes or cell elements |
| 3a2, 3b2, 3c2 | Positive electrodes or cell elements |
| 4a, 4b, 4c | Separators |
| 4a', 4b', 4c' | Separators |
| 4a'', 4b'', 4c'' | Separators |
| 4a1, 4b1, 4c1 | Separators |
| 4a2, 4b2, 4c2 | Separators |
| 5a, 5b, 5c | Cell Housings |
| 6a, 6b, 6c | Circumferential Housing Walls |
| 6a', 6b', 6c' | Circumferential Housing Walls |
| 7a, 7b, 7c | Electrically Conductive Walls |
| 8a, 8b, 8c | Peripheral Rims or Edge Portions |
| 9a, 9b, 9c, 9d, 9e | Housing Ends |
| 10 | Battery Casing |
| 11 | Battery Casing Bottom Wall |
| 12 | Battery Lid Member |
| 13 | Peripheral Rim or Edge Portion |
| 14 | Spot Weld |
| 15 | Projecting Portions |
| 16 | Casing rim |
| 17 | Inner Circular Groove |
| 18 | Inner Circular Groove |
| 19 | Annular Plastic Sealing Element or Ring |
| 20 | Annular Plastic Sealing Element or Ring |
| 21 | Coating |
| 22 | Spring Element |
| 25 | Insulating Plate |
| 25' | Insulating Plate |
| 26 | Electrical Conductors or Wires |
| 27 | Electrical Conductors or Wires |
| 28 | Contact Plate |

What is claimed is:

1. In a closed, gas-tight stacked, multiple-cell electric battery construction, in combination:
   (a) a cell comprising a pair (2a, 3a) of cooperable negative and positive slab-like cell elements disposed in stacked relation, presenting one negative outward face and one opposite positive outward face,
   (b) a circumferential electrically-insulating double-ended sealing housing (6a) surrounding both of said stacked cell elements (2a, 3a) and comprising a uniform-thickness annular wall having axially-aligned equal-area compression end faces,
   (c) said housing having one end adapted to be closed, and having its other end open,
   (d) an outwardly dished electrically conductive wall (7a) electrically connected to one outward face of said stacked cell elements (2a, 3a), said conductive wall having its peripheral edge portions axially inwardly offset and sealed in gas-tight and liquid-tight fashion to said one end of said housing,
   (e) said other open housing end being substantially coplanar with the other outward face of said stacked cell elements, and
   (f) substantially coplanar means (7b, 6b) directly engaging said coplanar other open housing end and said other element outward face, effecting a seal of said other open housing end, said substantially coplanar means comprising one end of a second double-ended sealing housing and a second outwardly dished conductive wall having an inwardly axially-offset periphery molded into and sealed to said second sealing housing and constituting an additional cell which has assembled negative and positive slab-like cell elements disposed in said housing,
   (g) the other end of said second housing and the outer face of the assembled cell elements contained therein being substantially coplanar to facilitate their being sealed.

2. A battery construction as in claim 1, wherein:
   (a) the double-ended housings are axially compressible to an extent, and
   (b) the said means which seals the said other open housing end applies an axial force thereto.

3. A battery construction as in claim 1, wherein:
   (a) said housings are constituted of a chemically resistant ductile plastic substance.

4. A battery construction as in claim 1, wherein:
   (a) the edge portions of the conductive wall are molded into the said first housing.

5. A battery construction as in claim 4, wherein:
   (a) the first housing is constituted of a plastic substance that is injection molded in the form of a ring, around the said edge portions of the conductive wall.

6. A battery construction as in claim 1, wherein:
   (a) the first housing is constituted wholly of a homogeneous plastic substance having a sealing-capability at its said other open end.

7. A battery construction as in claim 1, wherein:
   (a) said electrically-conductive wall has an annular axially displaced circumferentially rim portion which is molded into the first housing at a location spaced from the said other open end thereof.

8. A battery construction as in claim 1, wherein:
   (a) said electrically-conductive wall has projecting portions intimately engaged with an outward face of one of said first mentioned cell elements.

9. A battery construction as in claim 1, wherein:
   (a) said means for sealing the said other open housing end comprises a can-like casing having a rim defining an open casing end,
   (b) said stacked cell elements being disposed in close proximity to said open end of the casing, (c) a lid member disposed to cover the said electrically conductive wall, said lid member being electrically connected to said conductive wall,
(d) said lid member having a circumferential rim which is molded into said one housing end, and
(e) said casing rim being folded over the said one housing end which is adapted to be closed.

10. In a closed, gas-tight stacked, multiple-cell electric battery construction, in combination:
(a) a pair of cooperable negative and positive slab-like cell elements disposed in stacked relation, presenting one negative outward face and one opposite positive outward face,
(b) a circumferential electrically-insulating double-ended sealing housing surrounding said stacked cell elements, and comprising a uniform-thickness annular wall having axially-aligned equal area compression end faces,
(c) said housing having one end portion adapted to be closed, and having its other end open,
(d) an outwardly dished electrically conductive wall electrically connected to one outward face of said stacked cell elements, said conductive wall having its peripheral edge portions axially inwardly offset and embedded and sealed in gas-tight and liquid-tight fashion in said one end portion of said housing,
(e) said other open housing end being substantially coplanar with the other outward face of said stacked cell elements,
(f) a second pair of cooperable negative and positive slab-like cell elements disposed in stacked relation with said first-mentioned pair of elements and presenting one negative outward face and one opposite positive outward face,
(g) a second circumferential electrically insulating double-ended sealing housing surrounding said second pair of stacked cell elements, said second sealing housing comprising a uniform-thickness annular wall having axially-aligned equal-area compression end faces,
(h) said second sealing housing (6b) having one end adapted to be closed, and having its other end open,
(i) a second outwardly dished electrically-conductive wall electrically connected to one outward face of said second pair of cell elements, said second conductive wall being of cup-like configuration and having axially inwardly offset peripheral edge portions embedded and sealed in gas-tight and liquid-tight fashion in said second housing intermediate its ends and being electrically connected with said other outward face of said first-mentioned pair of stacked cell elements,
(j) said other open end of said second housing being substantially coplanar with the other outward face of said second pair of stacked cell elements, and
(k) substantially coplanar means (6c, 7c) directly engaging said second coplanar other open housing end and the other outward face of said second pair of cell elements, effecting a seal of said open end of said second housing.

11. In a closed, gas-tight stacked, multiple-cell electric battery construction, in combination:
(a) a pair of cooperable negative and positive slab-like cell elements disposed in stacked relation, presenting one negative active outward face and one opposite positive outward face,
(b) a circumferential electrically-insulating double-ended sealing housing (5a) surrounding both of said stacked cell elements and comprising a uniform-thickness annular wall having axially-aligned equal-area compression end faces,
(c) said housing having one end portion adapted to be closed, and having its other end open,
(d) an outwardly-dished electrically conductive wall (7a) electrically connected to one outward face of said stacked cell elements, said conductive wall having its peripheral edge portions axially inwardly offset and embedded and sealed in gastight and liquid-tight fashion in said one end portion of said housing,
(e) a lid member (12) disposed to cover the said electrically conductive wall, said lid member being electrically connected to said conductive wall,
(f) said other open housing end being substantially coplanar with the other outward face of said stacked cell elements,
(g) a second pair of cooperative negative and positive slablike cell elements disposed in stacked relation with said firstmentioned pair of elements and presenting one negative outward face and one opposite positive outward face,
(h) a second circumferential electrically insulating doubleended sealing housing (5b) surrounding said second pair of stacked cell elements, said second sealing housing comprising a uniform-thickness annular wall having axially-aligned equal-area compression faces,
(i) said second sealing housing having one end portion adapted to be closed, and having its other end open,
(j) a second outwardly-dished electrically-conductive wall (7b) electrically connected to one outward face of said second pair of stacked cell elements, said second conductive wall being of cup-like configuration and having axially inwardly off-set peripheral edge portions sealed in gas-tight and liquid-tight fashion in said second housing intermediate its ends and being electrically connected with said other outward face of said first-mentioned pair of stacked cell elements,
(k) said other open end of said second housing (5b) being substantially coplanar with the other outward face of said second pair of stacked cell elements,
(l) substantially coplanar means directly engaging said second coplanar other open housing end and said other second element outward face, effecting a seal of said other open end of said second housing,
(m) said lid member (12) and first-mentioned electricallyconductive wall (7a) being welded (14) together,
(n) said means for sealing the said other open end of said second housing comprising a can-like casing (11) having a bottom wall, and means (5c) carried by said bottom wall and sealingly engaged with said other open end of the second housing (5b).

12. In a closed, gas-tight stacked, multiple-cell electric battery construction, in combination:
(a) two pairs of cooperable negative and positive slab-like cell elements disposed in stacked relation, each pair presenting a negative outward face and an opposite positive outward face, said cell elements being connected in parallel, (b) a circumferential electrically-insulating double-ended sealing housing surrounding said stacked cell elements and comprising a uniform-thickness annular wall having axially-aligned equal-area compression end faces,
(c) said housing having one end adapted to be closed, and having its other end open,
(d) an outwardly dished electrically conductive wall electrically connected to one outward face of said stacked cell elements, said conductive wall having its peripheral edge portions axially inwardly offset and sealed in gas-tight and liquid-tight fashion to the said one end of said housing,
(e) said other open housing end being substantially coplanar with another outward face of said stacked cell elements, and
(f) substantially coplanar means directly engaging said coplanar other open housing end and said other outward face of said cell elements, effecting a seal of said other open housing end, said substantially coplanar means comprising a second double-ended sealing housing and second conductive wall constituting an additional cell having a negative and positive slab-like elements disposed axially of said first and second pairs of elements, said second sealing housing comprising a uniform-thickness annular wall having axially-aligned equal-area compression end faces.

13. A battery construction as in claim 12, wherein:
(a) the cell elements are arranged in rectified sequence in the pairs, and
(b) an insulating sheet is disposed between elements of different polarity in the pairs.

14. In a closed, gas-tight stacked, multiple-cell electric battery construction, in combination:
(a) a cell comprising three cooperable slab-like cell elements disposed in a stack, said stack presenting a pair of oppositely directed outward faces of like polarity, two of said elements being of one polarity and the third element being sandwiched between said two elements and being of an opposite polarity,
(b) a circumferential electrically-insulating double-ended sealing housing surrounding said stacked cell elements and comprising a uniform-thickness annular wall having axially-aligned equal-area compression end faces,
(c) said housing having one end adapted to be closed, and having its other end open,
(d) an electrically conductive wall electrically connected to one outward face of said stacked cell elements, said conductive wall having its edge portions embedded and sealed in gas-tight and liquid-tight fashion in said housing,
(e) said other open housing end being substantially coplanar with the other outward face of said stacked cell elements, and
(f) substantially coplanar means directly engaging said coplanar other open housing end and said other element outward face, effecting a seal of said other open housing end, said substantially coplanar means comprising a second double-ended sealing housing and second conductive wall constituting an additional cell having negative and positive slab-like elements disposed axially of said three cell elements, said second sealing housing comprising a uniform-thickness annular wall having axially-aligned equal-area compression end faces.

15. In a closed gas-tight stacked, multiple-cell electric battery construction, in combination:
(a) a common battery casing (10) having integral bottom and circumferential walls of an electrically conductive material, said casing having opposite to the said bottom wall (11) an open end,
(b) means comprising an electrically conductive lid (12) and electric insulation, for closing the open end of the casing,
(c) retainer means for holding the lid and insulation in place,
(d) a first electric battery bell (1a) arranged at the conductive lid and containing a negative slab-like element (2a), a positive slab-like cell element (3a), a separator plate therebetween, one of said elements being electrically connected with said lid (12),
(e) a second electric battery cell (1c) arranged at the bottom end portion of said battery casing and containing a negative slab-like cell element (2c), a positive slab-like cell element (3c) and a separator plate therebetween, one of said immediately preceding cell elements being electrically connected with the said bottom wall (11) of the battery casing (10),
(f) each of said first and second battery cells having a separate cell housing (5a, 5c) adapted to form a separate cell unit independent one from the other and presenting a negative outward face and a positive outward face,
(g) each cell housing (5a, 5c) comprising a circumferential electrically-insulating double-ended sealing wall (6a, 6c) and being axially compressible to an extent and each cell housing (5a, 5c) comprising a uniform-thickness annular wall having axially-aligned equal-area compression end faces, and being respectively spanned by first and second electrically conductive closure walls (7a, 7c) adjacent one housing end, and the opposite ends of the housings being open,
(h) said second electrically conductive closure wall (7c) being at its outer face substantially coplanar with the closed end of the corresponding housing wall (6c) and having an axially offset peripheral rim portion (8c) which is molded into said corresponding housing wall at a location between and spaced from the end faces thereof to form a gas-tight and liquid-tight sealing connection therewith,
(i) in each of said cell units one cell element is in engagement with the inner side of a closure wall and the free surface of the other cell element is substantially coplanar with said open end surface of the corresponding housing, and
(j) means directly engaged with said second closure wall, transmitting axial forces from the retainer means and first battery cell to said second closure wall.

16. A battery construction as in claim 15, wherein:
(a) said force-transmitting means comprises a third battery cell unit (1b) inserted between said first battery cell unit (1a) and said second battery cell unit (1c),
(b) said third battery cell unit (1b) having a cell housing (5b) comprising a uniform-thickness annular wall having axiallyaligned equal-area compression end faces, and cell elements (2b, 3b) in said housing (5b) which have an identical construction to the said second battery cell unit (1c).

17. In a closed, gas-tight stacked, multiple-cell electric battery construction, in combination:

(a) a cell comprising a pair (2a, 3a) of cooperable negative and positive slab-like cell elements disposed in stacked relation, presenting one negative outward face and one opposite positive outward face, (b) a circumferential electrically-insulating double-ended sealing housing (6a) surrounding said stacked cell elements (2a, 3a), and comprising a uniform-thickness annular wall having axially-aligned equal-area compression end faces, (c) said housing having one end adapted to be closed, and having its other end open, (d) an outwardly dished electrically conductive wall (7a) electrically connected to one outward face of said stacked cell elements (2a, 3a), said conductive wall having its peripheral edge portions axially inwardly offset and sealed in gas-tight and liquid-tight fashion to said one end of said housing, (e) said other open housing end being substantially coplanar with the other outward face of said stacked cell elements, and (f) substantially coplanar means (7b, 6b) directly engaging said coplanar other open housing end and said other element outward face, effecting a seal of said other open housing end.

18. In a closed, gas-tight stacked multiple cell electric battery construction, in combination:

(a) a plurality of ring-shaped insulating housings stacked end-to-end in contiguous sealing relation, (b) a plurality of dished, conducting disks having axially-offset peripheries which are embedded in corresponding end portions of said housings to form individual cell units, (c) one of said disks having central portions which are coplanar with end surfaces of its housing, (d) paired negative and positive cell slab assemblies having separators and electrolyte, wholly contained respectively in said cell units, and (e) an enclosure holding said cell units in axially-compressed assembled relation.

* * * * *